Oct. 17, 1967 A. J. SARKA 3,347,119
CUTTING METHOD AND APPARATUS
Filed March 10, 1965 3 Sheets-Sheet 1
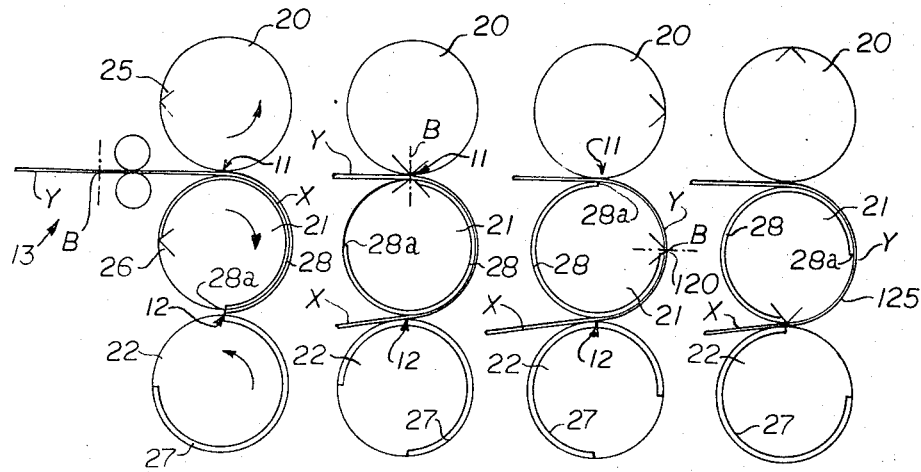
FIG.1A. FIG.1B. FIG.1C. FIG.1D.
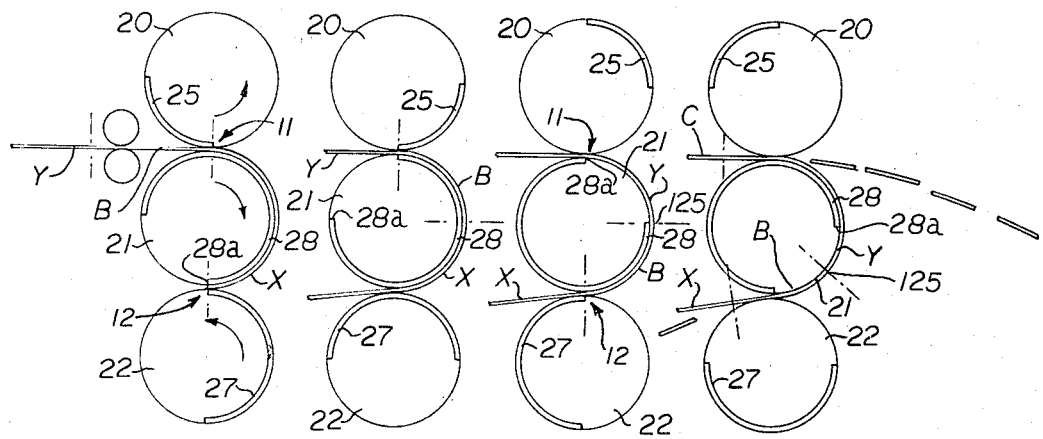
FIG.2A. FIG.2B. FIG.2C. FIG.2D.
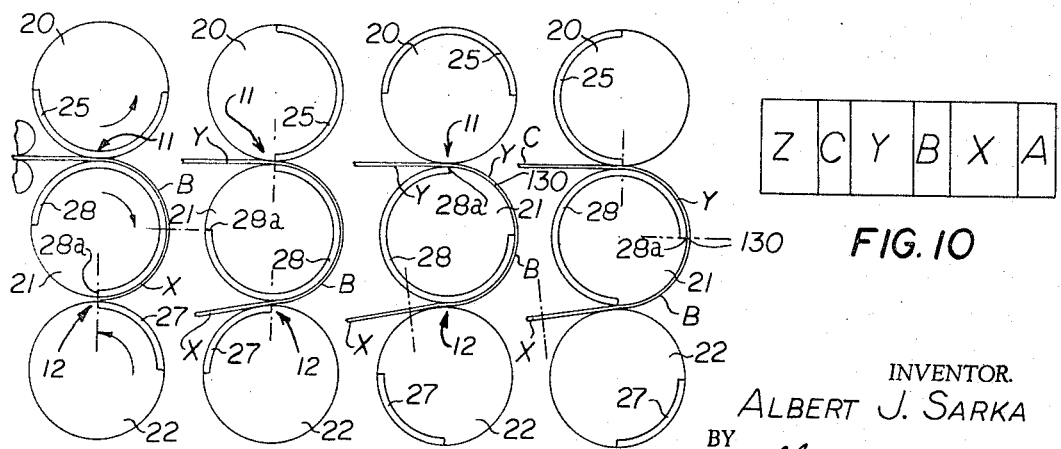
FIG.3A. FIG.3B. FIG.3C. FIG.3D.
FIG.10
INVENTOR.
ALBERT J. SARKA
BY
Hoffmann and Grant
ATTORNEYS Oct. 17, 1967  A. J. SARKA  3,347,119
CUTTING METHOD AND APPARATUS
Filed March 10, 1965  3 Sheets-Sheet 2
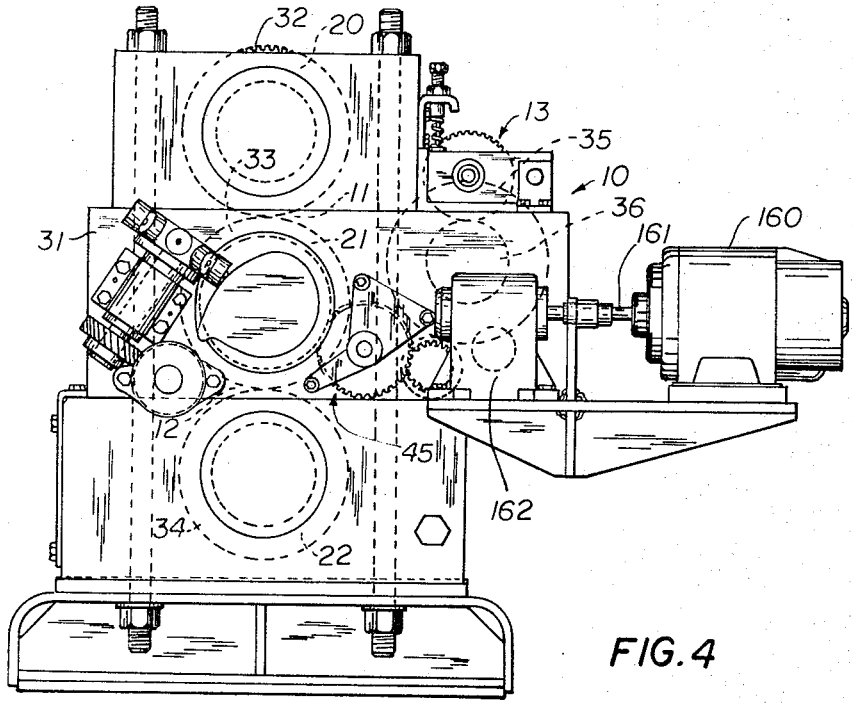
FIG. 4
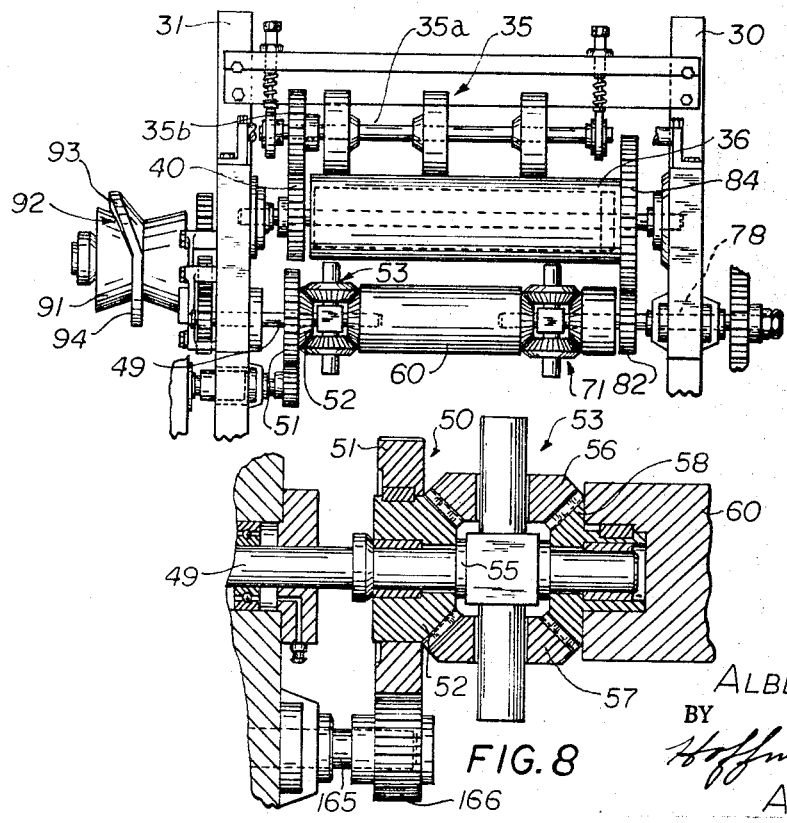
FIG. 5
FIG. 8
INVENTOR.
ALBERT J. SARKA
BY
Hoffmann and Yount
ATTORNEYS Oct. 17, 1967         A. J. SARKA         3,347,119

CUTTING METHOD AND APPARATUS

Filed March 10, 1965         3 Sheets-Sheet 3

INVENTOR.
ALBERT J. SARKA
BY
Hoffmann and Yoint
ATTORNEYS

United States Patent Office 3,347,119
Patented Oct. 17, 1967

3,347,119
CUTTING METHOD AND APPARATUS
Albert J. Sarka, Cleveland Heights, Ohio, assignor to Harris-Intertype Corporation, Cuyahoga, Ohio, a corporation of Delaware
Filed Mar. 10, 1965, Ser. No. 438,552
28 Claims. (Cl. 83—38)

ABSTRACT OF THE DISCLOSURE

Cutting apparatus including first and second work stations operable to perform separate work operations at alternate spaced locations on a sheet-like material being fed continuously therethrough including a variable speed advancing means for advancing the material through the work stations and a control for the advancing means operative to slow the advancing speed of the material to effect registration of alternate locations with the second work station.

---

This invention relates to a method and an apparatus for working on sheet-like material and, particularly, to a method and an apparatus wherein sheet-like material, as it is advanced, is worked upon by working elements carried by cylinder members.

A principal object of the present invention is the provision of a new and improved method and apparatus for working on sheet-like material as it is advanced through successive work stations and providing a high-speed operation, a minimum of material waste, and ready adjustment for varying the work performed on the material at the work stations.

A further object of the present invention is the provision of a new and improved high-speed method and apparatus for working on sheet-like material in web form wherein different operations may be performed at successive work stations and on alternate spaced locations of the web material and with a minimum of waste material and without stopping the advance of the material.

A still further object of the present invention is the provision of a new and improved method and apparatus, as noted in the next preceding paragraph, wherein alternate locations of lengths of material are worked upon at the successive stations and the length worked upon at each station can be readily varied and registered properly at the station where it is to be worked.

Another important object of the present invention is the provision of a new and improved rotary apparatus for working on sheet-like material as it is advanced through work stations defined by the nips of cylinders carrying material engaging work elements and which is readily adjustable for varying the work performed with minimum of down time and without requiring any cylinder changes, thereby eliminating the need for an inventory of various size cylinders and the cost involved therewith.

Another object of the present invention is the provision of a new and improved apparatus for working on web material and wherein different operations are performed at successive work stations and on alternate portions of the web material and where work elements engage the material at each station to work the material and may be varied at each work station to change the size of the portions of the material worked upon at each station, and wherein the apparatus includes adjustable drive means for varying the speed of advance of the web material so that the alternate portions of the web material are properly positioned at the work stations at the time the work elements are to engage the material.

A further object of the present invention is the provision of a new and improved apparatus for working on web material at successive work stations wherein the working elements at the work stations and the web material move at the same speed when work is being performed on the web material and the speed of advance of the web material is slowed when no work is being performed at the work stations so as to provide for proper registry of the working elements with the portion of the web material to be worked thereby.

A still further object of the present invention is the provision of a new and improved apparatus for working on web material at successive work stations, as noted in the next preceding paragraph, wherein the slowing of the web material is provided by varying the speed of operation of the feed means to the extent desired as determined by the ratio of change gears which may be varied to vary the extent of slowing.

An additional object of the present invention is the provision of a new and improved simple material working apparatus operable to provide a fine, extremely accurate control of the speed of the web to a work station so as to provide proper registry of the web at the work station and which provides for an infinite number of feed speeds for the web material and includes change gears for driving the web feeding means and provides for driving the feed means as determined by the ratio of the change gears and a control mechanism actuated by a sensing means which senses control indicators on the web so as to provide for fine adjustment of the speed of the feed means in addition to that provided by the change gears.

It is also an object of the present invention to provide a new and improved material working mechanism, as noted in the next preceding paragraph, wherein a double differential mechanism is in the drive for the material feed means and is utilized for controlling the speed of the feed means, one of which differential mechanisms is operated through the change gears and may be controlled by changing the gears, and the other of which is controlled through the control mechanism which includes a sensing means operable to sense indicators on the web and wherein the added effect of the double differential mechanism controls the feed to provide an extremely fine, accurate control for the feed of the material.

Yet another object of the present invention is the provision of a new and improved cutting or blanking apparatus wherein web material is cut or blanked at first and second successive stations defined by the nips of cylinders carrying cooperating cutting elements which cut or blank the web material as it is advanced through the nips of the cylinders and wherein the length of material worked on at each station may be readily adjusted and the speed of web feed controlled so that the web speed is synchronized with the speed of rotation of the cylinders during the blanking of the web and decreased to effect proper register of the web portion to be blanked and the cooperating work elements at the proper interval in the cycle of operation of the machine.

Another object of the present invention is the provision of a new and improved cutting or blanking apparatus, as noted in the next preceding paragraph, wherein the material cut at the first work station may be delivered from the apparatus at the first work station while the material cut at the second work station may be delivered from the apparatus at the second work station, thus providing for sorting or classifying of the material.

Still another object of a form of the present invention is the provision of a new and improved cutting apparatus of the rotary type having a pair of cylinders carrying cooperating cutting elements extending only around a part of the cylinders and which cut or blank material according to a predetermined pattern as the material is advanced therebetween, and cut-off means located in advance of the cylinders and cooperable to cut the material to transversely separate it so that the length of the material cut off corresponds to the circumferential extent of the cutting elements and wherein the drive for the feed means is controlled to slow the speed thereof so as to effect registry of the web and elements at the work station.

Further objects and advantages of the present tinvention will be apparent to those skilled in the art to which it relates from the following detailed description of the preferred embodiment thereof made with reference to the accompanying drawings forming a part of this specification and in which:

FIGS. 1A to 1D are schematic views showing different operative positions of a material working apparatus embodying the present invention for a given setup;

FIGS. 2A to 2D are schematic views showing different operative positions of the apparatus of FIG. 1 in a modified setup;

FIGS. 3A to 3D are schematic views showing different operative positions of the apparatus of FIG. 1 in a further modified setup;

FIG. 4 is a side elevational view of the apparatus embodying the present invention;

FIG. 5 is a fragmentary end view of the apparatus shown in FIG. 4, looking at the apparatus in FIG. 4 from the left;

FIG. 8 is an enlarged fragmentary sectional view of a portion of the apparatus shown in FIG. 5;

FIG. 10 is a schematic view of a portion of web material illustrating how the material is worked upon by the apparatus of FIG. 4.

Figure 6:
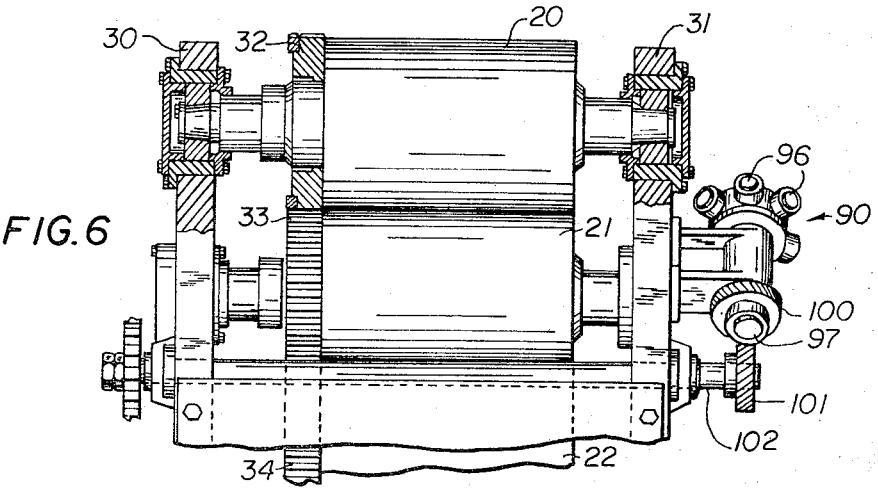
FIG. 6 is a fragmentary end view of the apparatus shown in FIG. 4, looking at the apparatus in FIG. 4 from the right.

The present invention provides a method and an apparatus wherein sheet-like material in web or sheet form is worked as it is advanced through successive work stations. The method and apparatus of the present invention may be used for performing different working operations on the material. The present invention is applicable for performing many different types of work operations on the sheet material; for example, the present invention may be used in printing, scoring, cutting, bending, etc. Preferably, however, the method and apparatus are used primarily in the blanking or cutting of sheet-like material in web form, and has its primary use in blanking or cutting from the web material box blanks according to a predetermined pattern. Accordingly, the preferred embodiment of the present invention to be described hereinbelow comprises a method and an apparatus for cutting or blanking sheet-like material in web form.

The preferred embodiment of the present invention comprises an apparatus for performing work operations on web material and is in the form of a web blanking or cutting apparatus, generally designated by the reference numeral 10. The apparatus 10 of the present invention preferably includes two cutting stations 11, 12 at which sheet material in web form is cut or blanked as it is advanced therethrough and web feed means 13 for feeding the web material toward the cutting or blanking stations 11, 12.

The cutting or blanking apparatus 10 is of the rotary type and the working stations 11, 12 are defined by the nips of a plurality of cylinders in which the material is cut as the web is advanced therethrough. The two working stations 11, 12 are provided by three cooperating cylinders designated 20, 21, and 22 in the drawings. The cylinder 20 is the upper cylinder, while the cylinder 21 is an intermediate cylinder, and the cylinder 22 is the lower cylinder, as shown in the drawings. The cylinders are mounted so that their surfaces rotate in closely adjacent paths, and the cylinder 20 and the cylinder 21 have a cooperating nip which defines the work station 11. The cylinder 21 and the cylinder 22 define a nip therebetween which provides the work station 12. The cylinders 20, 21, and 22 are of the same diameter and are driven by a conventional drive at constant and equal speeds.

The cylinders 20, 21, and 22 carry cooperating work engaging elements which move upon rotation of the cylinders to engage and work the material moving through the work stations. In the preferred embodiment, the cylinder 20 carries a cutting means 25 which cooperates with a corresponding cutting means 26 on the cylinder 21 so that upon rotation, they cooperate to cut the material. The cylinder 22 also carries a cutting means 27 which cooperates with another cutting means 28 carried by the cylinder 21. The cutting means 27, 28 cooperate to cut the material as it is fed through the nip defining the work station 12.

The cutting means carried by the cylinders 20, 21, and 22 include cooperating cutting elements which effect the cutting or blanking of the web material as it is advanced through the nips of the cylinders or the transverse separation of the web, as the case may be, and as described hereinbelow. The cutting means may be of any conventional and suitable form. Preferably, however, the cutting means 25, 26, 27, and 28 are as shown and described in my copending application Ser. No. 266,308, now abandoned and are in the form of cutting dies or plate members which extend around a portion of the periphery of the cylinders and are secured thereto in a convenient manner, as by plate clamps located in suitable gaps, not shown, in the cylinders. The plates are flexible plates and preferably include projecting portions in the form of lands formed by an etching process. The cutting operation is performed by the lands or projections coming adjacent to each other with a slight degree of overlap but without actual physical contact. In fact, the overlap performs an initial clamping of the sheet as the projections first come into contact with the material, then finally crush the material so as to sever it when the projections are aligned between the centers of the cylinders. The United States Downie Patent No. 3,142,233 discloses this mode of cutting in detail. These plates preferably carry creasing members as well as cutting elements so as to perform a cutting and creasing operation simultaneously within the nip of the cylinders at the work stations 11, 12. The cutting means 26, 27 carried by the intermediate cylinder 22 comprises one such plate with the cutting means 26 forming a part of the plate and the cutting means 27 forming another part of the plate.

It should be apparent from the above description that the work performed at each work station may vary depending upon the make-up of the plate means 25–28 and the arrangement of the cooperating elements carried thereby. Typical arrangements and setups will be described hereinbelow. As noted above, the apparatus 10 is preferably used for blanking box blanks from the web material and in such an event, the cutting die means 25, 26 are provided with a predetermined pattern of cutting elements so as to blank from the web as it is fed through the cutting station 11 a predetermined pattern and number of box blanks. Likewise, as the web is fed through the work station 12, the cutting die means 27, 28 cooperate to effect the blanking or cutting of box blanks from the web in number and pattern depending upon the arrangement of the cutting elements and creasing elements in the cutting die means.

The die means 25, 26 do not extend completely around the cylinders on which they are mounted and thus upon rotation cooperate to work on first alternate locations of the material or areas of the material and pass through the nip second alternate locations or areas of material unworked. The unworked or alternate areas of material which pass through the work station 11 are worked upon in the work station 12. This should be clearer upon reference to FIG. 10. As the material is advanced through the work station 11, the alternate areas or locations of the web material, designated A, B, and C, are worked upon in the work station 11, and the areas designated X, Y, and Z are advanced through the work station 11 unworked. The areas or locations X, Y, and Z are advanced to the work station 12 and are worked upon at the work station 12 by the cooperating die means 27, 28. Since alternate locations of the material are worked upon in the work stations 11, 12, respectively, the work performed at each of the work stations may vary considerably, as will be apparent from the description hereinbelow. Moreover, it is necessary to insure that the locations A, B, and C are properly registered at the work station 11 and that the alternate locations X, Y, and Z are properly registered at the work station 12. The apparatus of the present invention is constructed so as to effect this proper registration without material waste and without stopping the feed of the material, as will be apparent from the description hereinbelow.

As stated hereinabove, as the cylinders 20, 21, and 22 rotate, work elements on the cylinders cooperate to perform a work operation on alternate locations of the material at the work stations 11, 12, respectively. The cylinders 20, 21, and 22 are supported at their opposite ends by suitable bearing assemblies for rotation relative to frame members 30 and 31. The drive to the cylinders 20, 21, and 22 may be of any conventional form. The cylinders are of substantially the same diameter and preferably geared together as through gears 32, 33, 34 so as to rotate at identical surface speeds, and thereby permit the cooperating cutting elements on the plates, described hereinabove, to properly cooperate to work or cut the material as it is advanced between the nips of the cylinders.

The feed means 13 for effecting the feed of the material through the work stations 11, 12 comprises a pair of feed roller means 35, 36, see FIG. 5, which engage the opposite sides of the web material and effect the feed thereof upon rotation thereof. The feed roller means 35 includes a plurality of rollers mounted on a shaft 35a which carries a gear 35b which meshes with a gear member 40 secured to the shaft supporting the roller means 36.

Figure 7:
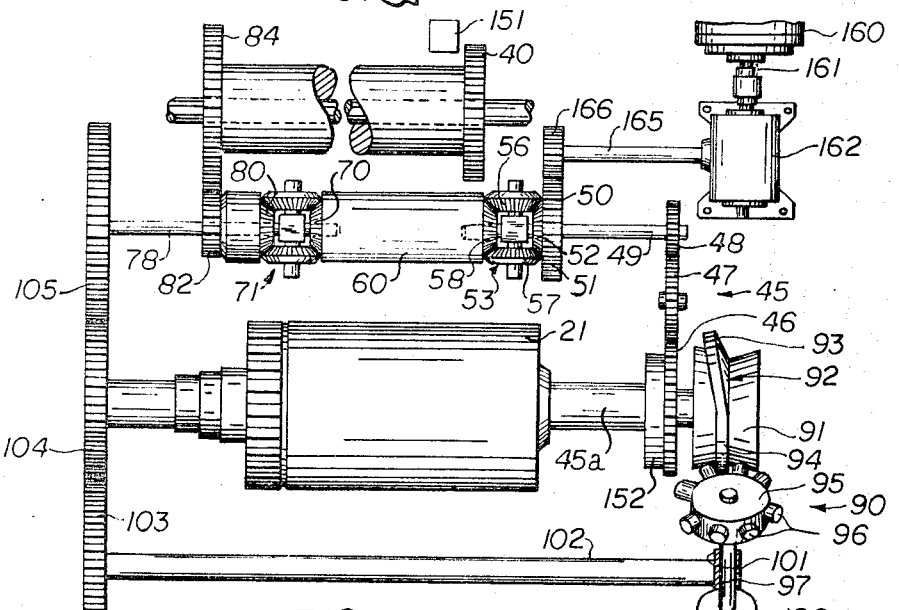
FIG. 7 is a schematic view of the drive mechanism used in the apparatus shown in FIG. 4.

The roller means 35, 36 are driven in a predetermined timed relationship with respect to the cylinders 20, 21, 22 by a suitable drive mechanism 45, best shown schematically in FIG. 7. The drive means 45 comprises a driving gear 46 carried by the shaft 45a carrying the cylinder 21. The gear 34 meshes with an idler gear 47, which in turn meshes with a pinion gear 48 keyed to a shaft 49 which extends transversely of the apparatus and substantially parallel to the cylinder 21. The shaft 49 rotatably carries a gear means 50, best seen in FIG. 8, which includes a pinion gear 51 and a bevel gear 52 fixedly secured to the pinion gear 51 and comprising the input gear of a differential drive mechanism 53. The end of the shaft 49 remote from the gear 48 is fixedly connected with a carriage or cage 55 of the differential mechanism 53.

The cage 55 of the differential mechanism carries a pair of bevel pinions 56, 57 rotatable about their own axes and which mesh with the pinion gear 52 and with a bevel pinion gear 58 which is fixedly secured to a tubular drive member or output member 60 so as to effect rotation of the output member 60 upon rotation of the gear 58. From the above description, it should be apparent that upon rotation of the gear 46, torque is transmitted to the cage 55 of the differential control 53 causing the pinion gears 56, 57 to rotate about the axis of the shaft 49, thereby effecting rotation of the gear 52 about its axis which normally may rotate with respect to the shaft 49 and rotation of the gear 58 about its axis. Rotation of the gear 58, of course, as noted above, causes rotation of the tubular member 60.

The output end or left end of the tubular member 60, as viewed in FIG. 7, carries a bevel pinion gear 70 fixedly connected thereto and forming a part of a second differential control means 71. The bevel pinion gear 70 meshes with opposite bevel pinion gears 73, 75, best seen in FIG. 9, which are rotatably supported for rotation about their own axes and which are carried by a differential cage 77. The differential cage 77 is carried by any fixedly connected to a shaft member 78, rotatably supported by the frame member 30, the purpose of which will be described hereinbelow. The pinion gears 73, 75 also mesh with a bevel pinion gear 80 rotatably carried by the shaft 78 and forming the output member of the differential 71. The bevel pinion gear 80 is fixedly connected through a connecting adapter or collar 81 to a pinion gear 82 which also is rotatably carried by the shaft 78 for rotation relative thereto. Upon rotation of the pinion 70 with the tubular or connecting member 60, the pinion gears 73, 75 will be rotated about their own axes causing rotation of bevel output pinion gear 80 of the differential control means 71 and rotation of the pinion gear 82 connected therewith relative to the shaft 78.

The pinion gear 82 meshes with a gear 84 carried by the shaft which carries the roller 36 of the feed means 13 and the gear 40. Thus, upon rotation of the gear 82, the gear 84 is rotated causing rotation of the roller means 36 and the gear 40, which in turn rotates the upper roller means 35 of the feed means 13 to thereby effect a feeding of the material to the cylinders. The speed of rotation of the feed means 13 for feeding the material is controlled by the particular relationship of the various gearing of the drive means 45 and is selected so that normally the feed means 13 will feed material at a speed which is substantially identical to the surface speed of the cylinders, so that the material and the surface speed of the cylinders are identical.

As noted hereinabove, the present apparatus is readily adjustable so as to effect a cutting or working of a different length or amount of material in each of the working stations 11, 12. This may be accomplished by varying the size and relationship of the cutting plates which cooperate to cut the material. Preferably, the work area of the plates is varied with the overall length of the plate remaining unchanged so that all plates may be changed on the cylinders by the clamping means located in the gaps thereof. As the description proceeds hereinbelow, reference will be made to a change in the size of the plates. It should be understood that this is to encompass a change in size of work area on the plates with the overall length of the plates being unchanged. For different jobs, plates of different work areas may be required, thus effecting a change in the length or amount of material worked upon in each nip. This change may be readily effected in the present invention by merely changing the plates on the various cylinders and effecting an adjustment in the gearing thereof, as will be described hereinbelow, depending upon the length of the material to be worked upon in each of the work stations.

Since the distance between the nips or work stations 11, 12 is preferably constant and namely, 180° or one-half the circumference of one of the cylinders, the change in size of the work area on the plates on the cylinders without a corresponding change in speed of feed of the material would result in material waste, as will be clearly apparent from the description hereinbelow. As a result, the preferred embodiment of the present invention is provided with a means for controlling the speed of the feed of the web material so as to effect proper registry of the locations A, B, C at the work station 11, and locations X, Y, Z at the work station 12 and thereby minimize waste material. Specifically, this means provides for slowing down the feed of the material during the nonworking portion of rotation of the cylinder 20, or namely, when no work is being done on the material in the nip of cylinders 20, 21. The feed is controlled or slowed down so that only the required length of material to be worked upon at the second station is fed through the work station 11 to the work station 12, and that after the required length of material has been fed through the work station 11, the work operation begins on the material at the work station 11.

The control means for controlling or decreasing the rate of feed of the web material is shown schematically in FIG. 7, and designated generally by the reference numeral 90. The control means is driven from the shaft 45a of the cylinder 21 and controls the speed of operation of the feed means 13 and specifically slows the speed of rotation of the gear 84 at predetermined intervals to effect a controlling of the speed of operation of the feed means 13. The control means 90 includes a control actuating member or disk member 91 which carries a cam 92 projecting therefrom. The cam 92 includes a first portion 93 extending as a screw thread for approximately 180 degrees around the disk member 91 at an angle with respect to the axis of rotation of the member 91, as shown in FIG. 7, and a second portion 94 extending for the remaining 180 degrees, and extending at substantially 90 degrees with respect to the axis of the cylinder 21, for purposes as will be described hereinbelow.

The cam member 92 cooperates with a cam wheel 95 which carries a plurality of cam followers 96 extending outwardly from the periphery thereof. The cam followers 96 are spaced around the periphery of the cam wheel 95 a distance such that the distance between the adjacent peripheral surfaces of the cam members 96 is equal to the width of the cam member 92. The cam member 92 is received in the space between the cam members 96 and upon rotation of the cam 92, the screw portion 93 thereof effects rotation of the cam wheel 95 which is supported on and carried by a shaft 97. For the 180 degrees of rotation of the screw portion 93 of the cam member, the screw portion 93 passes between the cam members 96 and the cam wheel 95 is rotated thereby. When the portion 94 of the cam 92 is rotated between the cam elements 96, the cam wheel 95 is not rotated due to the fact that there is no camming action when the portion 94 passes between the cam elements 96.

The shaft 97 which carries the cam wheel 95 extends angularly relative to the axis of the cylinder 21 and is rotatably supported by the side frame 31. The end of the shaft 97 remote from the end carrying the cam wheel 95 carries a worm gear 100. The worm gear 100 meshes with a worm wheel 101 carried by a transversely extending shaft member 102 which is rotatably supported by the side frames 30, 31 of the cutting and creasing mechanism 10. The end of the shaft 102 opposite the end carrying the worm wheel 101 carries a gear 103 which meshes with an idler gear 104 and which, in turn, meshes with another gear 105 which is fixedly secured to the shaft 78. As noted hereinabove, the shaft 78 is fixedly connected to the cage 77 of the differential control mechanism 71, which cage 77 carries the pinion gears 73, 75 thereof.

It should be noted from the description hereinabove that upon rotation of the cam wheel 95 which occurs during 180 degrees of rotation of the cylinder 20, the gear 105 is rotated and the cage 77 of the differential drive mechanism 71 is rotated about the axis of the shaft 78. Rotation of the cage 77 of the differential drive mechanism 71 causes the pinion gears 73, 75 to be rotated about the axis of the shaft 78, as well as about their own axes, as described hereinabove, through the drive mechanism 45. The direction of rotation of the pinion gears 73, 75 about the axis of the shaft 78 is such as to effect a slowing of the drive to the pinion gear 80 and as a result, the pinion gear 80 is slowed with respect to the pinion gear 70. This causes the gear 82 which is connected with the differential bevel gear 80 to be slowed and results in slowing the gear 84 and the speed of rotation of the feed roller means 35, 36 with respect to the speed of the cylinders 20, 21, 22.

From the above description, it can be seen that the control mechanism 90 effects a slowing of the feed roller means 35, 36 during 180 degrees of cylinder rotation through the differential control 71, and effects a controlled slowing of the feed of web material. The amount of slowing may be varied depending upon the speed of rotation of the shaft 78, as should be apparent from the description hereinabove. The speed of rotation of the shaft 78 can be controlled during the 180 degrees of rotation in which the slowing is accomplished by merely changing the relationship or ratio of the gears 103, 104, and 105. The shaft 78 can be made to turn approximately 180 degrees which would effect a great decrease in the speed of rotation of the roller means 35, 36 or can be rotated some lesser amount. The greater the amount of rotation of the shaft 78 through the control drive mechanism 90, the greater is the decrease in the speed of the sheet material or web material, and the lesser the amount of rotation, the less will be the decrease in the speed. As a result, it should be apparent that an infinite relationship can be achieved so as to provide an infinite number of drive speeds for the feed means 13 dependent upon the gear ratio or relationship of the gears 103, 104, 105. The gears 103, 104, 105 are change gears and may be changed so as to provide the proper or desired gear ratio. These gears may be selected as desired to provide the proper amount of slowing of the material.

The operation of the preferred embodiment of the present invention should be apparent from the description hereinabove. However, it should be made clearer upon reference to the schematic views 1-4, FIGS. 1A to 1D illustrate one setup of the apparatus and show the position of the various parts for the particular work setup illustrated. The setup shown in FIGS. 1A to 1D is such as to provide merely a transverse severing of the web material at the alternate locations A, B, C of the material at the first work station 11. It will be apparent that the transverse severing could be accomplished in this embodiment by a reciprocating cutting mechanism. At the second work station 12, the alternate locations X, Y, Z of the material are blanked out and the length of the material which is blanked is equal to three-fourths of the circumference of the cylinder 21 and, therefore, the work area of the plate or die means 27 carried by the cylinder 22 is equal to three-fourths of the circumference thereof.

In FIG. 1A, the material, for purpose of illustration, is shown in registry with the leading edge of the location or area X in registry at the work station 12 with the material previously separated at A and with the cylinders rotating and the feed means 13 feeding the material at the speed of rotation of the cylinders through operation of the drive 45. Upon 90 degrees of rotation of the cylinders from the position of FIG. 1A to the position of FIG. 1B, the location X of the material is cut and worked upon at the station 12 and the feed means continues feeding the material at the speed of rotation of the cylinders. Moreover, the cutting mechanisms 25, 26 are then effective to transversely shear and separate the web material at location B. When the cylinders are rotated through 90 degrees further from the position shown in FIG. 1B to the position shown in FIG. 1C, the material is still advanced at the speed of rotation of the cylinders, so there is no relative movement between the abutting but separated trailing edge of the length of material X still being cut or worked upon in the work station 12 and the leading edge of the next length of material Y to be worked on in the work station 12. The position shown in FIG. 1D illustrates a further operative position at 90 degrees of rotation beyond the position shown in FIG. 1C. In rotating to the position shown in FIG. 1D from the position shown in FIG. 1C, the web material is reduced in speed, as described above, through the operation of the control mechanism 90 and the change gears 103, 104, 105, and the leading edge of the length of material Y to be worked upon at the work station 12 is slowed to one-half the speed of rotation of the cylinders so that the leading edge of the length of material Y moves from the point designated 120 in FIG. 1C to the point designated 125 in FIG. 1D. Continued rotation of the cylinders through another 90 degrees causes the leading edge 28a of the plate means 28 on the cylinder 21 to catch up with the slowed down leading edge of the location Y of the material and when the plate 28 arrives at the position shown in FIG. 1A, the leading edge of the location Y has been likewise positioned, as shown in FIG. 1A, and registered with the leading edge of the plate means 28. Thus, there is no waste material, even though the plate means 28 does not extend entirely around the circumference of the cylinder 21. Moreover, the material has not been stopped. Upon continued rotation, the apparatus would continue to operate as above.

FIGS. 2A to 2D illustrate a further modification of the use of the present invention in a setup wherein blanking of the web material is effected in both of the work stations 11, 12. As shown in FIG. 2A, the material is positioned wherein the cutting is beginning in both of the work stations 11 and 12 at locations X and B, respectively, on the material with the material previously worked on at A. The cylinders are being rotated at a constant speed and the web material is being fed at the surface speed of the cylinder. After 90° of rotation of the mechanism, from the position shown in FIG. 2A to the position shown in FIG. 2B, the location B of the material has been worked upon at station 11. The location X of the material is still being cut at the work station 12 because of the length of the plate means 28 and 27 being in excess of 90 degrees of the cylinders. Upon another 90 degrees of rotation of the cylinders from the position shown in FIG. 2B to the position shown in FIG. 2C, the material is fed at cylinder speed. As shown in FIG. 2C, no work is being performed at either the work station 11 or 12. Upon further 90 degrees of rotation of the cylinders from the position of FIG. 2C to the position of FIG. 2D, the web is slowed relative to the speed of the cylinders, as described hereinabove, through the control mechanism 90, and the leading edge 28a of the plate means 28 travels through 90 degrees of rotation to the position shown in FIG. 2D. The web material and the leading edge 125 of the location Y of the web material to be cut or worked upon in the work station 12 moves from the position shown in FIG. 2C to the position indicated in FIG. 2D. Further rotation of the cylinders from the position shown in FIG. 2D, 90 degrees to the position shown in FIG. 2A, effects registry of the leading edge 28a of the plate means 28 with the leading edge 125 of the location Y in registry in the work station 12 so as to be effectively cut therein. At this point, the feed means 13 begins to advance the web at the speed of rotation of the cylinders and is no longer operated at the decreased speed effected by the control mechanism 90. Upon continued rotation, the apparatus continues to operate as above outlined.

FIGS. 3A to 3D illustrate a still further modified setup of the mechanism wherein the plates 25, 26, 27, 28 are of different work area sizes from that shown in FIG. 2. The modification shown in FIGS. 3A to 3D is illustrated only for purposes of illustrating the operation when a larger plate is positioned on the middle cylinder than as shown in FIGS. 2A–2D. As shown in FIG. 3A, the web material is shown with the location X positioned in registry at the working station 12 for beginning the operation thereon and with the location B being worked on at station 12, the location A previously having been worked. Upon rotation of the cylinder 90 degrees from the position of FIG. 3A to the position of FIG. 3B, the location X of the material moves through the work station 12 and is advanced at the speed of rotation of the cylinders and the location X is blanked or worked upon; the material at location B is also worked upon. As the cylinders rotate from the position shown in FIG. 3B to the position shown in FIG. 3C, no work is done at either of the work stations 11 or 12 and the web material is decreased in speed so that the leading edge 130 of the location Y is slowed relative to the leading edge 28a of the plate 28. Upon rotation of the cylinder from the position shown in FIG. 3B to the position shown in FIG. 3C, the leading edge 130 of the location Y moves to the position shown in FIG. 3D, while the leading edge 28a of the plate 28 moves to the position shown in FIG. 3C and reduces the distance between the leading edge of the plate and the leading edge of the material in half. As the cylinders rotate from the position shown in FIG. 3C to the position shown in FIG. 3D, the slowed or decreased speed of the web material is maintained under the control of the control means 90 and the leading edge 130 of the material moves to the position shown in FIG. 3D. The leading edge of the plate means 28, since it is moving at a faster rate of speed than the web material, moves to the position shown in FIG. 3D wherein the leading edge 130 of the location Y of the material and the leading edge 28a of the plate 28 are in registry. At this point, the control means 90 becomes inoperative to effect a decreased speed in advance of the web material and the web and the cylinders move at substantially the same speed to the position shown in FIG. 3A. During this rotation, a cutting operation is being performed at the work station 11. Upon continued rotation, the operation is repeated on additional alternate locations of the material.

The various lengths and sizes of the work areas of the die plate means carried by the cylinders have been shown in the above embodiments as being equal to predetermined quarter segments of the cylinders and this is purely for illustrative purposes only and to simplify the disclosure herein. The dimensions of the work areas may vary considerably within predetermined restrictions and with some limitations. When the sizes of the work areas of the plates require changing, the control means 90 must be varied to properly control the speed of the sheet or detract from the speed of the sheet material or web material so as to effect registry of the leading edge thereof and permit only the amount of material to be worked upon at the work station 12 to be fed through the work station 11. This can be accomplished by varying the particular gear ratio between the change gears 103, 104, 105, as above noted. By merely changing this gear ratio, the amount of decrease in speed of the feed rollers can be varied and thereby an extremely versatile and advantageous cutting mechanism is provided. By changing the disk member 91 so that the screw portion thereof is larger or smaller changes the number of degrees of cylinder rotation in which the slowing of the web is accomplished and will permit a greater variety of die sizes.

It should be apparent from the above description, that the cutting mechanism 10 may be used in numerous different ways. For example, the setups shown in FIGS. 2A to 2D and 3A to 3D may be effectively used for cutting two different jobs simultaneously and during one cycle of operation of the machine. Thus, the plate means 25 carried by the cylinder 20 and the cooperating plate means 26 carried by the cylinder 21 may be performing one type of operation for one job, while the plate means 28 and the cooperating plate means 27 perform another cutting job. Since these jobs are performed at different work stations simultaneously, automatic sorting of the jobs is readily achieved by collecting the cut material at the particular work station. To achieve this automatic sorting or classifying, it is necessary only to provide some suitable guide structure at the nip of the cylinders 20, 21 which would guide the material worked upon in the nip outwardly. This is shown schematically in FIGS. 2A to 2D.

On the other hand, since the change or reduced speed of the web is accomplished when no work is being performed at any of the work stations, the material need not be seperated transversely but may be kept in web form with the box blanks or the items being blanked from the material being retained in the web by small tabs or uncut portions securing the blanks to the web. The web may thus be rolled up and shipped in a rolled-up condition. Moreover, if desired, the box blanks can be completely severed providing the automatic sorting as described hereinabove.

From the above description, it should be readily apparent that the subject apparatus provides a highly improved cutting mechanism, and that a considerable variance in the speed of operation of the feeding means 13 may be effected by changing the gear ratio of the gears 103, 104, 105. It should be apparent, however, that in order to provide for an infinite variation in work area area size of the plates or adjustment to the mechanism, an infinite number of gear ratios would be required, necessitating a great plurality of gears, resulting in a gear inventory problem. The preferred embodiment of the present invention provides a control mechanism in order to provide the infinite control without requiring a large variety of sizes of change gears. This control may be termed a "fine control."

The fine control is additive in effect to the change gears and adds to the speed of the web or detracts from the speed of the web as effected by the change gears. The fine control includes a sensing means 151, shown schematically in FIG. 7, which may be in the form of a conventional photoelectric pickup unit positioned adjacent to the feed roller means 13 so as to sense control indicators on the web material being fed. The control indicators sensed by the sensing means 151, in the present embodiment, are printed marks on the web material. However, they may be in the form of holes or slits in the web, or any type indicator which may be sensed. The indicators, of course, are formed on the web at a predetermined desired location relative to the locations A, B, C, as is well known, so as to provide the control function at the proper time in the machine cycle. The fine control also includes a means for sensing the rotational position of the cylinders. This means comprises a rotary control switch 152, or some other suitable conventional structure such as shown in United States Patent No. 2,090,307.

The rotary switch 152 is of the type which completes a circuit therethrough during a predetermined interval during the rotation of the cylinders and has a fixed contact or brush 152 and a rotating contact or ring 152b having conducting segments 152b', 152b", separated by nonconducting segments. The switch 152 is in a circuit including a control relay 153 controlled by the sensing means 151. If the sensing means 151 senses the position of the control indicator on the web when the rotary switch 152 provides a circuit therethrough, a completed circuit is made, as shown in the above patent, to a reversible electric motor 160 having an output shaft 161. The motor is energized and drives its output shaft 161 depending upon whether the sensing mechanism, namely, the photocell pickup 151 and the rotary switch 152 indicate that the web material is in advance of where it should be or withdrawn from where it should be. In the event that the web material is properly positioned, when the photocell 151 senses an indicator, the rotary switch at that time completes no circuit and the motor is not energized.

Figures 9, 11:
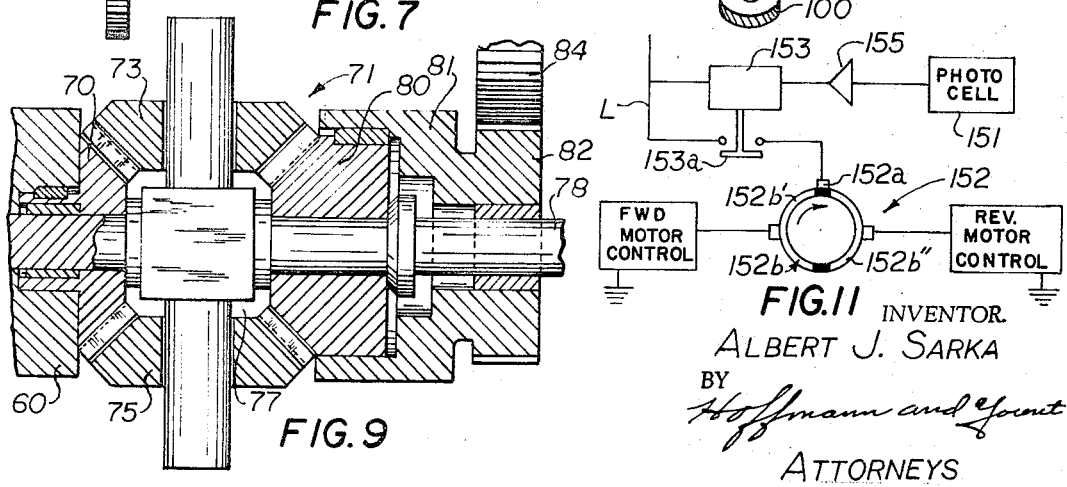
FIG. 9 is an enlarged fragmentary sectional view of another portion of the apparatus shown in FIG. 5.
FIG. 11 is a schematic circuit diagram forming a part of the apparatus of FIG. 4.

The operation of the photocell 151 and the rotary switch 152 for energizing the motor 160 will be apparent from the following description of the schematic circuit diagram shown in FIG. 11. Referring to FIG. 11, the contact 152b of the control switch 152 rotates in timed relation with the rotation of the cylinders and as the contact 152b rotates, conducting portions 152b' and 152b" engage the fixed contacts 152a and the contacts leading to the forward and reverse motor controls, respectively.

The photocell 151 when it senses a control indicator provides a current flow through amplifier 155 and relay 153 causing energization of the relay 153. Energization of the relay 153 causes relay contacts 153a to close. The relay contacts 153a are in the circuit with the fixed contact 152a of the rotary switch 152. If the control indicator on the web material is properly positioned with respect to the cylinders when the photocell 151 senses the indicator, the rotary switch 152 will be in a position wherein contact 152a is in engagement with the nonconductive segment of the rotary contact or ring 152b and, thus, no circuit will be completed through the switch 152 and the motor 160 will not be energized.

On the other hand, if the ring contact 152b is in a position wherein one of the conductive segments 152b' or 152b" is in engagement with the stationary contact 152a, either the forward or reverse motor control, respectively, will be energized depending upon which of the contacts 152b' or 152b" is in engagement with the fixed contact 152a. Energization of the forward and reverse motor controls causes the motor 160 to be energized to rotate its output shaft in the opposite direction.

The ouput shaft 161 of the motor 160 is connected through a gear reduction unit 162 to a drive shaft 165, see FIG. 7. The shaft 165 driven through the gear reduction unit carries a gear 166 which meshes with the gear 51 of the gear means 50 of the differential control unit 53. Upon rotation of the gear 166, the gear 51 will be rotated relative to the shaft 49 and the bevel pinion gear 52 of the differential control 53 likewise will be rotated, depending upon the direction of rotation of the shaft 165 and the gear 166. By rotating the pinion 52 of the differential about the axis of the shaft 49, the pinion gears 56, 57 in mesh with the gear 52 will be rotated in a direction to increase the speed of rotation or in a direction opposite to decrease their speed of rotation. Thus, if the pinion gears 56, 57 are rotated in a direction to increase their speed of rotation, the pinion 57 will likewise be rotated in a direction to increase its speed of rotation and the speed of rotation of the roller means 35, 36 will be increased through the drive including the control differential 71. If the pinion gear 57 is decreased in speed through the operation of the motor 160, the roller means 36, 35 will likewise be decreased in speed through the control differential 71, as should be apparent from the description hereinabove. Thus, through the provision of the motor 160 and the sensing means for actuating the motor in response to control indicators on the printed web, the motor 160 will provide a fine control for the feed means 13 so that the alternate areas or locations of the web are properly located and provides for an infinitely variable speed change in the feeding roller means without the necessity of an infinite plurality of change gears. If such an infinite control is unnecessary, of course, it could be eliminated and only the change gear mechanism utilized as described hereinabove.

It should be understood that the preferred embodiment of the present invention has been described hereinabove in considerable detail and that certain modifications, changes, and adaptations therein may be made by those skilled in the art to which it relates from the description thereof, and it is hereby intended to cover all such modifications, changes, and adaptations which come within the scope of the appended claims.

Having described my invention, I claim:

1. An apparatus for performing separate work operations on alternate locations of a length of sheet-like material comprising a first work station having first work engaging means movable to engage first spaced locations of the material and operable on the material at said first locations as the material is advanced through the first work station, a second work station spaced from said first work station and having second work engaging means movable to engage second spaced locations of the material which are intermediate, said first locations and operable to work on the material at said second locations as the material is advanced through said second work station, advancing means for advancing said material through said first and toward said second work station and located in advance of the first work station so that said first work station is located intermediate said second work station and said advancing means, and drive means for said advancing means operable to drive said advancing means so that the advancing speed of said material is equal to the speed of movement of the first work engaging means when said first work engaging means are working on said material and including control means operable during the interval after said material is worked upon at one of said first locations at said first work station and before the material is worked upon at said second work station to slow the speed of operation of the advancing means to effect registry of said one of said second locations and said second work engaging means at said second station.

2. An apparatus for performing separate work operations on alternate locations of sheet-like material as defined in claim 1 wherein said first work engaging means comprise cutting elements operable to transversely separate the sheet-like material at said first work station and said second work engaging members comprise die means operable to blank the material as it is advanced through said second work station.

3. An apparatus for performing separate work operations on alternate locations of sheet-like material as defined in claim 1 wherein said first and second work engaging means comprise blanking means operable to blank the first and second locations of the material respectively at said first and second work stations respectively.

4. An apparatus as defined in claim 1 wherein said first work station is defined by the nip of cooperating first and second cylinder members, and the second work station is defined by the nip of a third cylinder cooperating with said second cylinder.

5. An apparatus as defined in claim 4 wherein said nip of said first and second cylinder members is spaced 180° from the nip of said second and third cylinder members.

6. An apparatus as defined in claim 4 wherein the material worked upon at said first station is delivered thereat and the material worked upon at said second station is delivered thereat thereby providing for sorting thereof.

7. An apparatus for performing separate work operations on alternate locations of a length of sheet-like material comprising a first work station having first work engaging means movable to engage first spaced locations of the material and operable to work on the material at said first work station as the material is advanced through the first work station, a second work station spaced from said first work station and having second work engaging means movable to engage second spaced locations of the material which are intermediate said first locations and operable to work on the material at said second locations as the material is advanced through said second work station, advancing means for advancing said material through said first and toward said second work station, and drive means for said advancing means operable to drive said advancing means so that the advancing speed of said material is equal to the speed of movement of said first work engaging means when said first work engaging means are working on said material, control means operable during the interval after said material is worked upon at one of said first locations at said first station and before the one of said second locations following said one of said first locations is worked upon at said second work station to momentarily slow the advancing speed of said material to effect registry of said one of said second locations and said second work engaging means at said second station and to prevent engagement of said second work engaging means with at least a part of said one of said first locations, said control means being adjustable to change the amount of variance in the speed of operation of said advancing means.

8. An apparatus as defined in claim 7 wherein said drive means includes a differential mechanism operable to transmit driving torque to said advancing means, and said control means includes a drive mechanism operatively connected to said differential mechanism to slow the output speed thereof relative to said input speed.

9. An apparatus as defined in claim 8 wherein said drive mechanism includes a plurality of change gears driven during said interval, one of said change gears being drivingly connected with said differential, and wherein the gear ratio between said change gears determines the amount that said output speed is slowed relative to said input speed.

10. An apparatus as defined in claim 9 further including first drive means driving said first and second work engaging members at substantially the same speed, and second drive means driving said input of said differential at a speed proportional to the speed of said work engaging members.

11. An apparatus for performing separate work operations on alternate locations of a length of sheet-like material comprising first and second cylinders mounted for rotation with the surfaces thereof in closely spaced positions and defining a nip therebetween comprising a first work station, said first and second cylinders carrying first and second work engaging means movable with the cylinders to engage first spaced locations of the material and operable to work on the material at said first locations as the material is advanced through the nip, a third cylinder mounted for rotation adjacent said second cylinder and the surfaces of said third cylinder and said second cylinder defining a nip therebetween forming a second work station spaced from the first work station, said second and third cylinders having third and fourth cooperating work engaging means mounted thereon movable upon rotation of the cylinders to engage second spaced locations of the material which are intermediate said first locations and operable to work on the material at said second locations as the material is advanced through said second nip, said first, second, third and fourth work engaging members being supported on plates releasably connected to said first, second and third cylinders, advancing means for advancing said material through said first and toward said second work station, drive means for said advancing means operable to drive said advancing means so that the advancing speed of the material is equal to the speed of movement of said first work engaging members when said first work engaging members are working on the material in said first nip and including control means operable during the interval after said material is worked upon at one of said first locations in said first nip and before the one of said second locations following said one of said first locations is worked upon at said second nip to slow the speed of operation of said advancing means to effect registry of said one of said second locations and said second work engaging means at said second nip, said control means being adjustable to change the amount of variance in the speed of operation of said advancing means.

12. An apparatus for performing separate work operations on alternate locations of a length of sheet-like material as defined in claim 11 wherein said first and second work engaging members comprise cutting members operable to transversely separate the work material at said first alternate locations and said third and fourth work engaging members comprise die means operable to blank or cut said second locations of said material which are alternate with said first locations.

13. An apparatus for performing separate work operations on a length of sheet-like material as defined in claim 11 wherein said first and second work engaging members operable on the material in said first nip comprise die means operable to blank the material and third and fourth work engaging members comprise die means operable in said second nip to blank said second locations of said material as the material is fed therethrough.

14. An apparatus for performing separate work operations on alternate locations of a length of sheet-like material as defined in claim 11 wherein said means comprises a double differential mechanism operatively associated with said advancing means to control the speed of operation of said advancing means.

15. An apparatus for performing separate work operations on alternate locations of a length of sheet-like material as defined in claim 14 wherein said control means comprises a plurality of change gears, one of said change gears being drivingly connected with a first one of said differentials and the gear ratio between said change gears determining the amount that said output speed of said first differential is slowed relative to the input speed thereof.

16. An apparatus as defined in claim 15 wherein said output speed of the second differential is controlled by a motor and a gear means drivingly connected with the motor and with the differential mechanism to slow the output speed thereof upon actuation of the motor, and sensing means including means operable to sense the location of an indicator on the web material to actuate said motor when the indicator indicates that the web is out of position relative to the work engaging members.

17. An apparatus as defined in claim 11 wherein said drive means includes a double differential mechanism operable to control the speed of said advancing means and including a pair of differentials, a change gear mechanism operatively associated with the output of one of said differentials to slow the output speed thereof relative to the input thereof, a motor drivingly connected with the second differential and operatively associated therewith to vary the output speed thereof relative to the input speed upon actuation of the motor, sensing means for sensing an indicator on the web and operative in response to said sensing to actuate said motor, and means connecting the output of one of said differentials with the input of the other of said differentials.

18. An apparatus comprising advancing means for feeding a web, drive means for said advancing means for advancing the web at a predetermined speed, said drive means including a double differential mechanism operable to control the speed of said advancing means and including a pair of differentials, a change gear mechanism operatively associated with the output of one of said differentials to slow the output speed thereof relative to the input thereof, a motor drivingly connected with the second differential and operatively associated therewith to vary the output speed thereof relative to the input speed upon actuation of the motor, sensing means for sensing an indicator on the web and operative in response to said sensing to actuate said motor, and means connecting the output of one of said differentials with the input of the other of said differentials.

19. An apparatus for performing separate work operations on alternate locations of a length of sheet-like material comprising a first work station having first work engaging means movable to engage first spaced locations of the material and operable to work on the material at said first locations as the material is advanced through the first work station, a second work station spaced from said first work station and having second work engaging means movable to engage second spaced locations of the material which are intermediate said first locations and operable to work on the material at said second locations as the material is advanced through said second work station, advancing means for advancing said material through said first and second work stations with the advancing speed of said material being equal to the speed of movement of said work engaging means when said work engaging means are working on said material and cyclically operating control means for said advancing means operable after said material is worked upon at one of said first locations at said first work station and before the one of said second locations following said one of said first locations is worked upon at said second work station to vary the speed of operation of said advancing means to effect registry of said one of said second locations and said second work engaging means at said second station.

20. An apparatus for performing separate work operations on alternate locations of a length of sheet-like material comprising a first work station having first work engaging means movable to engage first spaced locations of the material and operable to work on the material at said first locations as the material is advanced through the first work station, a second work station spaced a predetermined distance from said first work station and having second work engaging means movable to engage second spaced locations of the material which are intermediate said first locations and operable to work on the material at said second locations as the material is advanced through said second work station, advancing means for continuously advancing said material through said first and second work stations with the advancing speed of said material being equal to the speed of movement of said work engaging means when said work engaging means are working on said material, and cyclically operating control means operable after said material is worked upon at one of said first locations at said first work station and before the one of said second locations following said one of said first locations is worked upon at said second work station to vary the speed of the material to effect registry of said one of said second locations and said second work engaging means at said second station, said control means being adjustable to change the amount of variance of the speed of operation of said advancing means.

21. An apparatus for performing separate work operations on alternate locations of a length of sheet-like material comprising a first work station having first work engaging means movable to engage first spaced locations of the material and operable to work on the material at said first locations as the material is advanced through the first work station, a second work station spaced from said first work station and having second work engaging means movable to engage second spaced locations of the material which are intermediate said first locations and operable to work on the material at said second locations as the material is advanced through said second work station, advancing means for advancing said material through said first and toward said second work station, and drive means for said adavncing means operable to drive said advancing means so that the advancing speed of said material is equal to the speed of movement of said work engaging means when said work engaging means at said first station is working on said material, and cyclically operating control means operatively connected with said drive means and operable after said material is worked upon at one of said first locations at said first work station and before the one of said second locations following said one of said first locations is worked upon at said second work station to control said drive means to vary the speed of operation of said advancing means to effect registry of said one of said second locations and said second work engaging means at said second station.

22. An apparatus as defined in claim 21 wherein said control means is operable when no work is being performed at either of said work stations.

23. A method of working sheet-like material comprising feeding the material at a predetermined speed through a first work station, moving material engaging elements located at the first work station at said predetermined speed to work on the material at first spaced locations thereof as the material is advanced through the first work station, feeding second locations of said material intermediate said first locations past said first work station when said material engaging elements at said first work station are ineffective to engage said material and through a second work station, moving material engaging elements located at the second work station at the speed at which said second locations move through said second work station to work on said second locations thereof as said material is advanced through said second work station, and momentarily changing the speed of movement of said material from said predetermined speed while each of said second alternate locations thereof is advancing toward said second station and after the immediately preceding first location has been worked upon at said first station to effect registry of said second locations with the work engaging elements at said second station and to prevent engagement of said preceding first location by said work engaging elements at said second station.

24. A method as defined in claim 23 wherein the speed is varied when no work is being performed at either work station.

25. A method of working sheet-like material comprising feeding the material at a predetermined speed toward successive work stations spaced a predetermined distance apart and through a first work station, moving material engaging elements located at the first work station at said predetermined speed so as to work on the material only at first spaced locations thereof as the material is advanced through the first work station, advancing second locations of said material intermediate said first locations past said first work station and toward said second work station, moving material engaging elements located at the second work station at said predetermined speed so as to work only on said second locations thereof as said web material is advanced through said second work station, and changing the speed of movement of said material while each of said second alternate locations thereof is advancing toward said second station and after the preceding first location has been worked upon at said first station to effect registry of said second locations with the work engaging elements at said second station.

26. A method of working sheet-like material comprising the steps of feeding the material through successive work stations spaced a predetermined distance apart, working one length of said material as it moves continuously through a first station, allowing a second length of said material to be fed through said first station and to a second station, working said second length of material as it is continuously advanced through said second station, controlling the speed of movement of said second length of material when no work is being performed at either of said stations and effecting thereby registry of said second length of material at said second station.

27. A method of working sheet-like material comprising feeding the sheet material at a predetermined speed through a first work station, moving material engaging elements located at the first work station at said predetermined speed to work on the material at first spaced locations thereof as the material is advanced through the first work station, feeding second locations of said material intermediate said first locations past said first work station and through a second work station, moving material engaging elements located at the second work station at the speed at which said second locations move through said second work station to work on said second locations thereof as said material is advanced through said second work station, and varying the speed of movement of said material while each of said second alternate locations thereof are advancing toward said second station and after the immediately preceding first location has been worked upon at said first station to effect registry of said second locations with the work engaging elements at said second station, and wherein said material is severed transversely at said first station and the speed of the material is varied while work is being performed at said second station.

28. A method of working sheet-like material comprising feeding the sheet material at a predetermined speed toward successive work stations spaced a predetermined distance apart and through a first work station, moving material engaging elements located at the first work station at said predetermined speed so as to work on the material at said first spaced locations thereof as the material is advanced through the first work station, advancing second locations of said material intermediate said first locations past said first work station and toward said second work station, moving material engaging elements located at the second work station at said predetermined speed so as to work on said second locations thereof as said web material is advanced through said second work station, and controlling the speed of movement of said material while each of said second alternate locations thereof is advancing toward said second station and after the preceding first location has been worked upon at said first station to effect registry of said second locations with the work engaging elements at said second station, said material worked upon at said first station being sorted immediately after said first station and the material worked upon at said second station being sorted at a position after said second station.

References Cited
UNITED STATES PATENTS

| | | | |
|---|---|---|---|
| 977,501 | 12/1910 | Bailey | 83—313 X |
| 2,321,647 | 6/1943 | Brougham et al. | 226—31 X |
| 2,458,538 | 1/1947 | Socke | 83—255 X |
| 2,500,230 | 3/1950 | Bailey | 226—30 X |
| 2,549,605 | 4/1951 | Huck | 226—30 X |
| 3,053,129 | 9/1962 | Aronson et al. | 83—255 X |
| 3,186,273 | 6/1965 | Tomberg | 83—74 |
| 3,220,347 | 11/1965 | Luehrs | 226—30 |

WILLIAM W. DYER, Jr., *Primary Examiner.*

JAMES M. MEISTER, *Examiner.*